(12) United States Patent
Gholami et al.

(10) Patent No.: US 8,630,545 B2
(45) Date of Patent: Jan. 14, 2014

(54) MULTIMODE OPTICAL SYSTEM

(75) Inventors: Asghar Gholami, Isfahan (IR); Denis Molin, Draveil (FR); Pierre Sillard, Le Chesnay (FR); Yves Lumineau, Herblay (FR)

(73) Assignee: Draka Comteq, B.V., Amsterdam (NL)

( * ) Notice: Subject to any disclaimer, the term of this patent is extended or adjusted under 35 U.S.C. 154(b) by 594 days.

(21) Appl. No.: 12/614,172

(22) Filed: Nov. 6, 2009

(65) Prior Publication Data

US 2010/0142969 A1 Jun. 10, 2010

(30) Foreign Application Priority Data

Nov. 7, 2008 (FR) ...................................... 08 06238

(51) Int. Cl.
*H04B 10/12* (2011.01)
*H04B 10/00* (2013.01)

(52) U.S. Cl.
USPC ........... 398/143; 398/158; 398/159; 398/192; 398/193; 398/194

(58) Field of Classification Search
None
See application file for complete search history.

(56) References Cited

U.S. PATENT DOCUMENTS

| | | | | |
|---|---|---|---|---|
| 4,067,642 A * | 1/1978 | King et al. | ...................... | 385/37 |
| 4,838,643 A | 6/1989 | Hodges et al. | | |
| 5,574,816 A | 11/1996 | Yang et al. | | |
| 5,717,805 A | 2/1998 | Stulpin | | |
| 5,761,362 A | 6/1998 | Yang et al. | | |
| 5,881,187 A * | 3/1999 | Modavis | .......................... | 385/37 |
| 5,911,023 A | 6/1999 | Risch et al. | | |
| 5,982,968 A | 11/1999 | Stulpin | | |
| 6,035,087 A | 3/2000 | Bonicel et al. | | |
| 6,066,397 A | 5/2000 | Risch et al. | | |
| 6,085,009 A | 7/2000 | Risch et al. | | |
| 6,134,363 A | 10/2000 | Hinson et al. | | |
| 6,175,677 B1 | 1/2001 | Yang et al. | | |
| 6,181,857 B1 | 1/2001 | Emeterio et al. | | |
| 6,210,802 B1 | 4/2001 | Risch et al. | | |
| 6,215,931 B1 | 4/2001 | Risch et al. | | |
| 6,314,224 B1 | 11/2001 | Stevens et al. | | |
| 6,321,012 B1 | 11/2001 | Shen | | |

(Continued)

FOREIGN PATENT DOCUMENTS

EP 1921478 A1 5/2008
EP 2184868 A1 5/2010

(Continued)

OTHER PUBLICATIONS

U.S. Appl. No. 60/986,737, filed Nov. 9, 2007, pp. 1-65.

(Continued)

*Primary Examiner* — Ken Vanderpuye
*Assistant Examiner* — Darren E Wolf
(74) *Attorney, Agent, or Firm* — Additon, Higgins, Pendleton & Ashe, P.A.

(57) ABSTRACT

Disclosed is an optical system including a polychromatic optical source emitting multiple transverse modes, an optical link having at least one portion of multimode optical fiber, and an optical device positioned between the optical source and the input of the multimode optical fiber. The optical device can modify the distribution of the energy coupling of the transverse modes emitted by the source in the propagation modes of the multimode optical fiber. The optical system makes it possible to use low-cost transverse multimode optical sources for producing high-bandwidth Ethernet transmission networks having excellent performance.

20 Claims, 10 Drawing Sheets

(56) References Cited

U.S. PATENT DOCUMENTS

| | | |
|---|---|---|
| 6,321,014 B1 | 11/2001 | Overton et al. |
| 6,334,016 B1 | 12/2001 | Greer, IV |
| 6,363,195 B1 | 3/2002 | Abbott, III et al. |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,139,457 B2 | 11/2006 | Guan et al. |
| 7,162,128 B2 | 1/2007 | Lovie et al. |
| 7,194,155 B1 | 3/2007 | Kahn et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,646,954 B2 | 1/2010 | Tatat |
| 7,817,891 B2 | 10/2010 | Lavenne et al. |
| 2004/0184492 A1 | 9/2004 | Windover |
| 2005/0062181 A1* | 3/2005 | Walker .................. 264/1.24 |
| 2005/0078962 A1 | 4/2005 | Hofmeister et al. |
| 2007/0166042 A1 | 7/2007 | Seeds et al. |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0119202 A1 | 5/2010 | Overton |
| 2010/0142969 A1 | 6/2010 | Gholami et al. |
| 2010/0202741 A1 | 8/2010 | Ryan et al. |
| 2011/0044595 A1 | 2/2011 | Sillard et al. |

FOREIGN PATENT DOCUMENTS

| | | | |
|---|---|---|---|
| GB | 2399963 A * | 9/2004 | ............. H04B 10/12 |
| WO | 2005/062505 A1 | 7/2005 | |
| WO | 2009/062131 A1 | 5/2009 | |

OTHER PUBLICATIONS

U.S. Appl. No. 61/041,484, filed Apr. 11, 2008 , pp. 1-82.

U.S. Appl. No. 61/112,595, filed Nov. 7, 2008, pp. 1-321.

Gholami et al., "Optimization of VCSEL Spatiotemporal Operation in MMF Links for 10-Gigabit Ethernet" IEEE Journal of Selected Topics in Quantum Electronics, vol. 12, No. 4, Jul./Aug. 2006, pp. 767-775.

Gloge et al., "Multimode Theory of Graded-Core Fibers", Bell System Technical Journal 1973, pp. 1563-1578.

Olshansky et al.,"Pulse Broadening in Graded Index Optical Fibers", Applied Optics, vol. 15, No. 2, Feb. 1976, pp. 483-491.

Khadijetou et al., "Modeling and characterization of VCSEL-based Avionics Full Duplex Ethernet (AFDX) gigabit links", SPIE, vol. 6908, Jan. 2008, pp. 1-5.

French Search Report and Written Opinion in counterpart French application No. 0806238 dated Jul. 20, 2009, pp. 1-9.

European Search Report and Written Opinion in counterpart European application No. 09013815 dated Nov. 27, 2009, pp. 1-9.

Notice of Intention to Grant counterpart European application No. 09013815 dated May 2, 2011, pp. 1-4.

Refi, "LED Bandwidth of Multimode Fibers as a Function of Laser Bandwidth and LED Spectral Characteristics", Journal of Lightwave Technology, vol. LT-4, No. 3, Mar. 1986, pp. 265-272.

Gholami, et al., "Physical Modeling of 10 GbE Optical Communication Systems", Journal of Lightwave Technology, vol. 29, No. 1, Jan. 2011, pp. 115-123.

Decision to grant a European patent in counterpart European Application No. 09013815, dated Sep. 29, 2011, pp. 1-2.

* cited by examiner

[PRIOR ART]

MULTIMODE OPTICAL SYSTEM

CROSS-REFERENCE TO PRIORITY APPLICATION

This application claims the benefit of pending French Application No. 08/06238 for "Modal Dispersion Compensation for Transversally Multimode Sources" (filed Nov. 7, 2008, at the French Patent Office), which is hereby incorporated by reference in its entirety.

FIELD OF THE INVENTION

The present invention relates to the field of optical fiber-transmissions and, more specifically, short-distance optical transmission systems requiring a broad bandwidth.

BACKGROUND

Multimode optical fibers are used for short-distance applications and local networks. The core of a multimode fiber generally has a diameter of approximately 50 microns (μm) and a numerical aperture greater than 0.2. By way of comparison, a single-mode fiber generally has a diameter of approximately 8 to 9 microns (μm) and a numerical aperture greater than 0.12. Thus, for a particular wavelength, several optical modes propagate simultaneously along the fiber, carrying the same information. The bandwidth is directly linked to the group velocity of the optical modes propagating in the multimode core of the fiber. To guarantee a high bandwidth, it is necessary for the group velocities of all the modes to be identical. In other words, the intermodal dispersion (i.e., the difference in group velocity between the slower mode and the faster mode) should be minimized for a particular wavelength. The multimode fibers have been the subject of international standardization under standard ITU-T G.651, which, in particular, defines criteria (e.g., bandwidth, numerical aperture, and core diameter) that relate to the requirements for optical fiber compatibility. The standard ITU-T G.651 is hereby incorporated by reference in its entirety.

To reduce the intermodal dispersion in a multimode fiber, it has been proposed since the 1970s to produce graded-index fibers with a parabolic core profile. Such an optical fiber has been used for many years and its characteristics have been described in particular in the publications "*Multimode Theory of Graded-Core Fibers*" by D. Gloge et al., Bell System Technical Journal 1973, pp. 1563-1578, and "*Pulse Broadening in Graded-Index Optical Fibers*" by Olshansky et al., Applied Optics, Vol. 15, No. 2, February 1976. Each of these publications is hereby incorporated by reference in its entirety.

A graded-index profile can be defined by a relationship between the index value n at a point as a function of the distance r from this point to the center of the fiber:

$$n = n_1 \sqrt{1 - 2\Delta \left(\frac{r}{a}\right)^\alpha}$$

wherein, $\alpha \geq 1$; ($\alpha \to \infty$ corresponding to a step-index profile);
$n_1$ is the maximum index of the multimode core;
a is the radius of the multimode core; and $$\Delta = \frac{(n_1^2 - n_0^2)}{2n_1^2};$$

wherein, $n_0$ is the minimum index of the multimode core, generally corresponding to the index of the cladding (typically made of silica).

A multimode fiber with a graded index therefore has a core profile with a rotational symmetry such that along any radial direction the value of the index decreases continuously from the center of the fiber to its periphery. These curves are generally representative of the theoretical or target profile of the optical fiber, though fiber-manufacturing constraints may lead to a slightly different profile.

When a light signal propagates in such a core having a graded-index, the different modes experience a different propagation medium, which affects their speed of propagation differently. By adjusting the value of the parameter α, it is therefore possible to theoretically obtain a group velocity that is virtually equal for all the modes and thus a reduced intermodal dispersion for a particular wavelength. A value for the parameter α of between 1.8 and 2.2 generally allows a satisfactory limitation of the modal dispersion.

That said, an optimum value of the parameter α is valid for one particular wavelength. Thus, a multimode fiber typically transmits a monochromatic optical signal having a particular wavelength for which the alpha (α) profile of the fiber has been optimized. U.S. Pat. No. 6,363,195, which is hereby incorporated by reference in its entirety, proposes to compensate for the modal dispersion of a multimode optical link by using a concatenation of multimode fibers in order to optimize the bandwidth for two transmission windows, one centered on 850 nanometers and the other on 1300 nanometers. This patent proposes to use a length of a first multimode fiber having a value of parameter $\alpha_1$ of between 0.8 and 2.1 to optimize the bandwidth at 850 nanometers and a length of a second multimode fiber having a value of parameter $\alpha_2$ between the first value $\alpha_1$ and 8 to optimize the bandwidth at 1300 nanometers.

Furthermore, the exact parameter value α is difficult to control during fiber manufacturing. In order to compensate the profile deviations from a theoretical profile having an optimum value α, U.S. Pat. No. 7,139,457 proposes a concatenation of multimode fibers. The alpha (α) profile of each fiber and the length of each fiber are optimized in order to maximize the bandwidth over a given optical link. U.S. Pat. No. 7,139,457 is hereby incorporated by reference in its entirety.

Using fiber concatenations for modal dispersion compensation leads to more complex and more costly optical systems. Moreover, the foregoing documents are not concerned with the spectral dispersion of the sources used.

In this regard, the sources used in optical transmission systems are not generally monochromatic. By way of example, the widely used vertical-cavity, surface-emitting diode lasers (VCSEL) have a wide-spectrum discrete emission. The VCSELs used in high-speed transmissions are generally longitudinally, but not transversally, single mode. Each transverse mode of the laser has its own wavelength corresponding to the various peaks of the emission spectrum (i.e., the emission spectrum has a spatial dependence).

Accordingly, a multimode fiber has an alpha profile with a value of parameter α optimized for one particular wavelength. Thus, the introduction of a polychromatic optical signal originating from a transverse multimode source in a multimode fiber causes the appearance of a modal dispersion and consequently a reduction in the bandwidth.

U.S. Patent Publication No. 2004/0184492, which is hereby incorporated by reference in its entirety, proposes to use only one single transverse mode of a VCSEL source by conditioning the emitted signal before its introduction into the multimode fiber. The use of a single transverse mode of a VCSEL source however greatly reduces the power of the emitted signal and leads to a reduction in the power received by an optical receiver at the end of the line, resulting in a reduction in the performance of the optical system. Moreover, filtering part of the transverse modes of the VCSEL increases the relative intensity noise (RIN). In this regard, reference may be made to the publication of A. Gholami et al., "*Optimization of VCSEL Spatiotemporal Operation in MMF Links for 10-Gigabit Ethernet*" IEEE Journal of Selected Topics in Quantum Electronics, Vol. 12, No. 4, July/August 2006.

U.S. Patent Publication No. 2005/0078962, which is hereby incorporated by reference in its entirety, proposes to offset the VCSEL output from the center of the multimode fiber in order to introduce the signal into a "large bandwidth zone." Such an offsetting, however, is difficult to control and needs to be adjusted for each fiber. Moreover, it may introduce substantial power loss, which is detrimental to the transmission quality.

British Patent No. 2,399,963, which is hereby incorporated by reference in its entirety, discloses a plurality of transverse modes of a polychromatic optical signal launched in a multimode fiber using a launch technique that restricts the number of modes launched into the fiber. In particular, this document suggests limiting the proportion of encircled flux launched into the fiber within a certain radius from the center, and limiting the radius within which a higher proportion of encircled flux is launched. A disadvantage of this kind of filtering is that it decreases the signal-to-noise ratio. Moreover, it does not resolve the issue with respect to wavelength dependency of modal dispersion of each propagation mode of the fiber.

A need therefore exists for an optical system using transverse multimode polychromatic sources, which has a broad effective bandwidth without excessive loss of the power emitted by the source.

SUMMARY

In one aspect, the invention is directed to an optical system including a polychromatic optical source for emitting an optical signal having a plurality of transverse modes of unique transverse mode order, an optical link having at least one portion of multimode optical fiber, and an optical device positioned between the optical source and the input of the multimode optical fiber. In some embodiments, the optical device is suitable for spatially rearranging the plurality of transverse modes dependent on a transverse mode order. The transverse mode order is selected for coupling the energy of each of the transverse modes into a suitable propagation mode to at least partially compensate the modal dispersion of the optical link for chromatic dispersion.

In another aspect, the invention proposes a rearrangement of the coupling of the transverse modes emitted by the source in the fiber in order to limit, or compensate for, the modal dispersion induced by a polychromatic signal. The rearrangement, typically, does not require filtering of the modes emitted by the source. Therefore, the signal-to-noise ratio of the system is not degraded. Typically, the optical device used is capable of modifying the distribution of the energy coupling of the transverse modes emitted by the source in the propagation modes of the fiber.

In one embodiment, the optical device is suitable for coupling the energy of at least one of the transverse modes into at least one suitable propagation mode of the optical link, and the transverse mode order of at least one transverse mode differs from the order of at least one propagation mode. In this regard, the optical device is suitable for coupling the energy of a source mode in a propagation mode of a different order in the fiber.

According to another exemplary embodiment, the optical device is suitable for distributing the energy coupling of a transverse mode of the source in a plurality of propagation modes of the fiber.

According to another exemplary embodiment, the multimode fiber has an effective modal bandwidth ($EMB_c$) of less than 4700 MHz-km and the system has an effective bandwidth (EB) greater than or equal to 6000 MHz-km.

According to another exemplary embodiment, the source has a maximum spectral width ($\Delta\lambda_{max}$) between about 1 nanometer and 2 nanometers. For example, the source can be a surface emitting laser (VCSEL) or a light-emitting diode (LED).

According to another exemplary embodiment, the system has a product of distance by Gigabit Ethernet data rate which is greater than 3000 Gb/s·m.

The foregoing, as well as other characteristics and advantages of the invention and the manner in which the same are accomplished, are further specified within the following detailed description and its accompanying drawings.

DETAILED DESCRIPTION

In this regard, the invention proposes an improved multimode optical system for use with a polychromatic source, such as a VCSEL laser, having several transverse modes.

Figure 1:
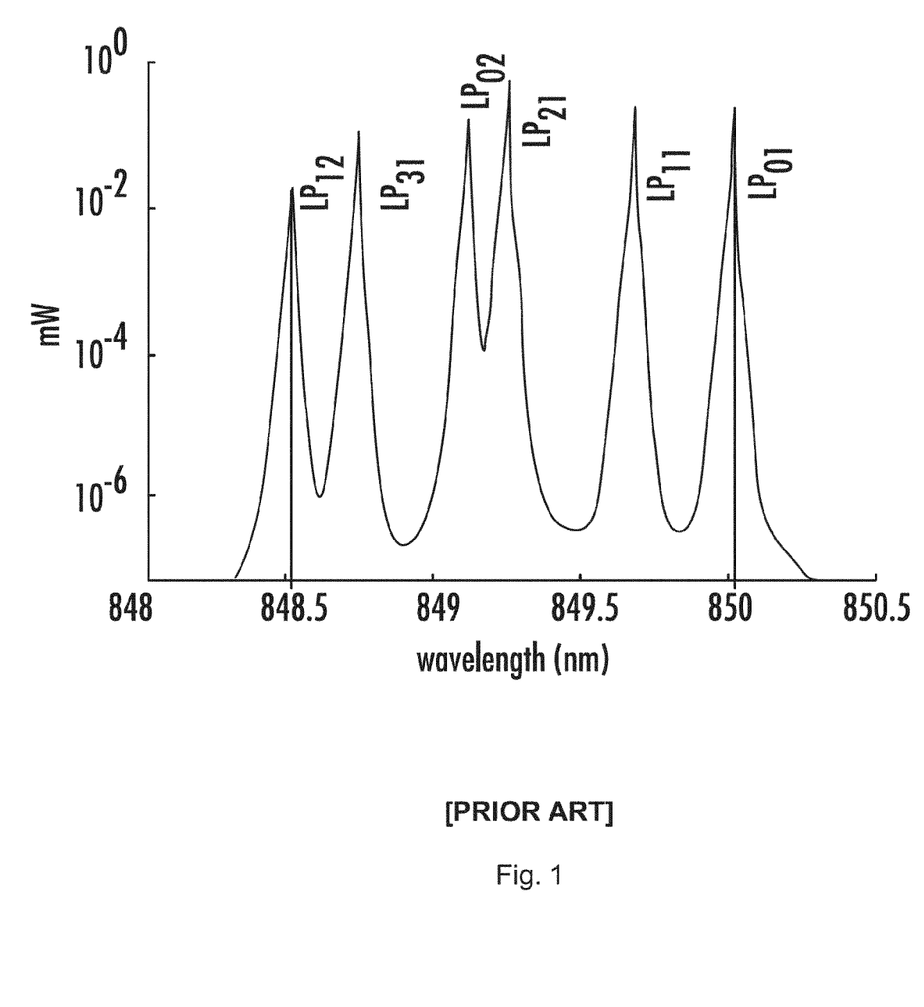
FIG. 1 graphically represents an emission spectrum of a VCSEL laser.

FIG. 1 illustrates an emission spectrum of a VCSEL laser, with a mode centered on 850 nanometers for the excitation of the fundamental mode LP01. FIG. 1 illustrates that each transverse mode of the laser has its own wavelength. The maximum RMS (Root Mean Square) spectral width generally authorized for high-speed transmission is 0.46 nanometers RMS for the VCSEL (as defined in the standard IEEE 802.3ae).

In this regard, when the optical signal emitted by the VCSEL is introduced into the multimode fiber, each transverse mode of the VCSEL diffracts differently. The transverse modes of the highest order diverge more rapidly (i.e., due to their phase and spatial distribution of their energy), and will therefore be coupled more specifically in the high order modes of the fiber. Those having ordinary skill in the art will appreciate that the high order modes of the VCSEL occupy the lowest wavelengths in the spectrum. This spectral and spatial distribution of the VCSEL modes results in the highest order modes of the fibers mostly carrying the lowest wavelengths in the spectrum. Therefore, the chromatic dispersion will further delay the higher order modes relative to the delay of the fundamental mode.

In fact, a multimode fiber typically has chromatic dispersion on the order of −100 ps/(nm·km) at a wavelength of 850 nanometers. The chromatic dispersion can vary between about −80 and −120 ps/(nm·m) in the 840-nanometer to 860-nanometer spectral range. Such chromatic dispersion will induce a modal dispersion by further delaying the optical fiber's higher order modes, which have shorter wavelengths; the higher order modes are mainly excited by the transverse modes having the greatest divergences and therefore also the shorter wavelengths. This dispersion is independent of the modal dispersion because the chromatic dispersion depends on the material whereas the modal dispersion depends on the profile of the fiber.

The chromatic dispersion will thus introduce a modal dispersion referred to as "Modal and Chromatic Dispersion Interferences" (MCDI) resulting in a limitation of the bandwidth.

The modal dispersion induced by the chromatic dispersion can be expressed according to the following equation:

$$\Delta \tau = 2 \times \Delta \lambda_{RMS} \times D \times L$$

wherein, $\Delta \tau$ is the modal dispersion of the light pulse;

$\lambda_{RMS}$ is a half-width of the emission spectrum of the source;

D is the chromatic dispersion in the multimode fiber, typically −100 ps/(nm·km) at 850 nanometers; and L is the length of the multimode fiber considered.

To date, high-bitrate transmission Ethernet networks are in operation, with bitrates of the order of 10 GbE (10 Gb/s). To provide such bitrates over more than 300 meters and 550 meters, respectively, it is necessary to guarantee an effective bandwidth greater than or equal to 2000 MHz·km and 4700 MHz·km, respectively. The standard TIA-492AAAC-A standardizes the required performances for 50-micron, high-bitrate multimode fibers. In the case of multimode fibers, however, the bandwidth depends on the source used. The effective modal bandwidth (EMB) corresponds to the bandwidth of the source-fiber pair when the chromatic dispersion is disregarded. The effective bandwidth (EB) corresponds to the bandwidth of the fiber when both the modal dispersion and the chromatic dispersion, including the MCDI, are taken into account.

In this regard, the effective modal bandwidth (EMB) is determined by a measurement of the delay caused by the modal dispersion, known as "Dispersion Mode Delay" (DMD) graphical representation. The procedure for measuring the DMD is the subject of standardization, such as IEC 60793-1-49 and FOTP-220, each of which is hereby incorporated by reference in its entirety. To carry out this EMB measurement, care is generally taken to use a source or a fiber length such that the chromatic dispersion is actually negligible; the purpose is to characterize the modal dispersion of the fiber.

Figure 2:
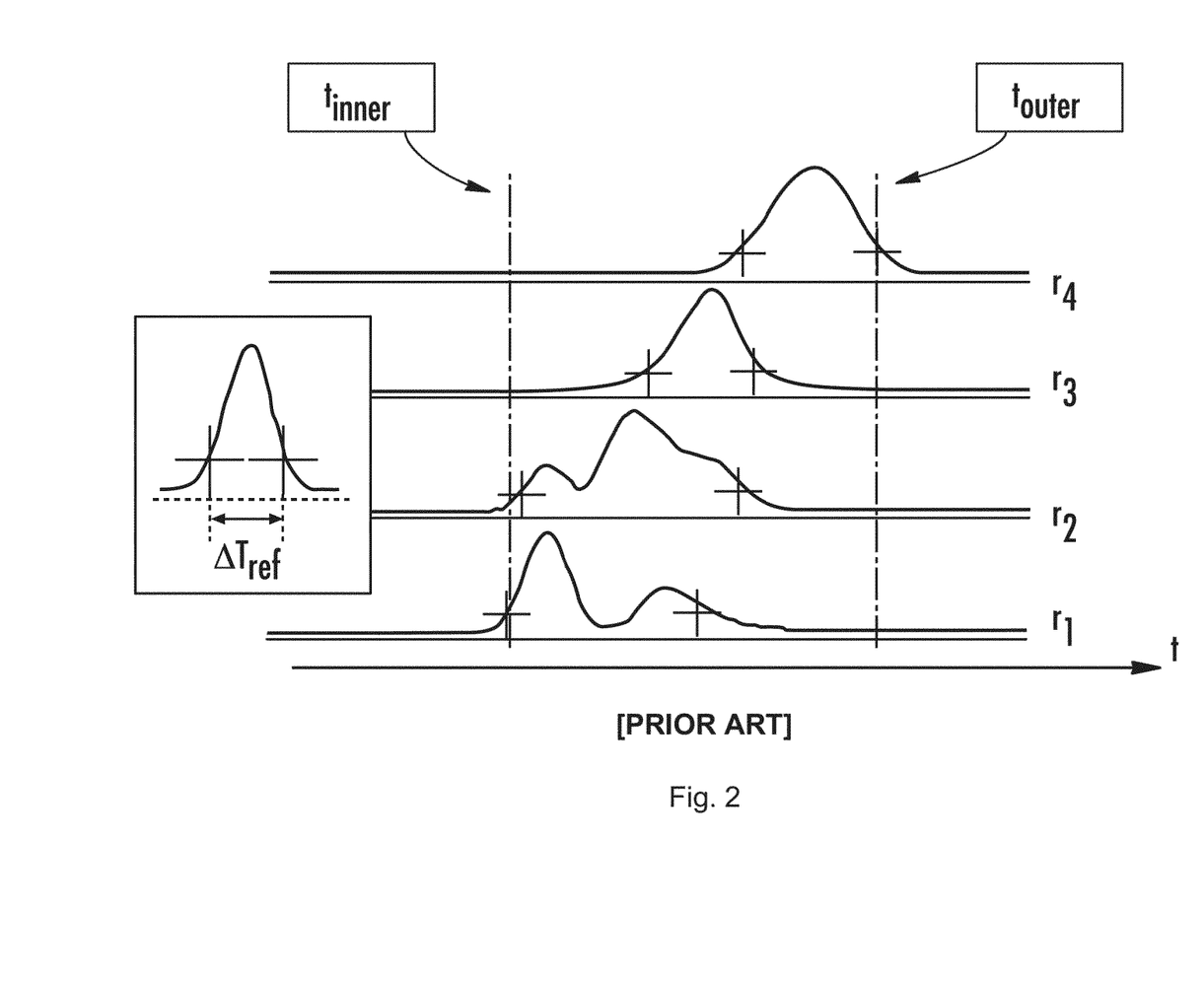
FIG. 2 schematically depicts the calculation of the delay due to the modal dispersion DMD according to the criteria of the standard FOTP-220.

FIG. 2 illustrates a schematic diagram of the calculation of the delay due to the modal dispersion DMD according to the criteria of the standard FOTP-220 as published in its version TIA SCFO-6.6 of (Nov. 22, 2002).

A DMD graphical representation is obtained by injecting a light pulse having a particular wavelength $\lambda_0$ at the center of the fiber and measuring the pulse delay after a particular fiber length L. The introduction of the light pulse of particular wavelength $\lambda_0$ is radially offset to cover the entire core of the multimode fiber.

A light pulse is injected at different radial positions ($r_1$, $r_2$, $r_3$, $r_4$) with respect to the center of the multimode optical fiber core. The width of the pulse $\Delta T_{ref}$ is measured at a quarter of the height, generally at the output, of the fiber of length L. The delay due to the modal dispersion $DMD_{inner\&outer}$ is then measured between a first point in time $t_{inner}$ at a quarter of the height of the leading edge of the first trace $r_1$, and a second point in time $t_{outer}$ at a quarter of the height of the trailing edge of the last trace $r_4$. The value of $DMD_{inner\&outer}$ is then defined according to the following relationship:

$$DMD_{inner\&outer} = (t_{outer} - t_{inner} \Delta T_{ref})/L$$

When the parameter α of the multimode fiber is set to an optimum value ($\alpha_{optimum}$), there is virtually no shift in the light pulse delay for a particular wavelength $\lambda_0$ regardless of the injection point of the pulse along the radius r of the fiber core; the intermodal dispersion is low and the effective modal bandwidth is high. However, this alignment on the DMD graphical representation of the light pulse delays, regardless of the radius r, is valid for one particular wavelength $\lambda_0$ for a particular value of parameter α (i.e., $\alpha_{optimum}$).

Figure 3:
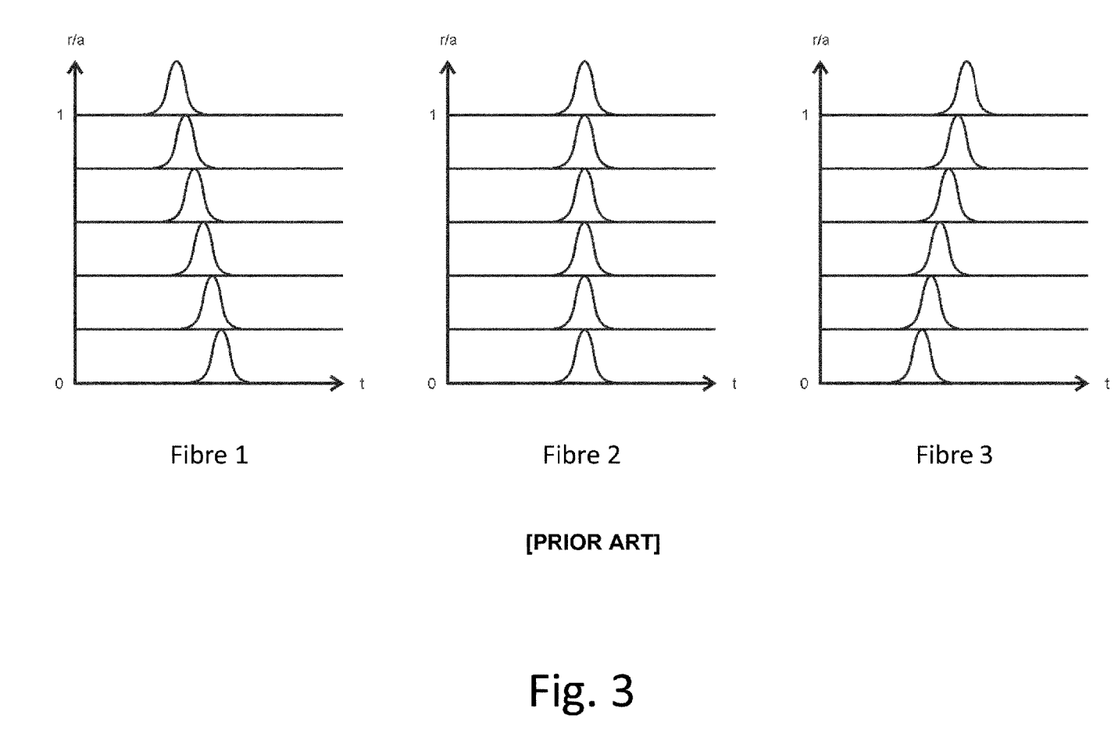
FIG. 3 graphically represents DMD graphs of three multimode fibers plotted for a single mode input light pulse.

FIG. 3 graphically represents DMD graphs of three multimode fibers used with a single mode source. Fiber 2 of FIG. 3 shows a substantially aligned DMD graph. In other words, each pulse exhibits the same delay after a particular length of fiber regardless of the radial point of injection of the signal (r/a). The modal dispersion is therefore virtually zero for the wavelength of the source used. The DMD graphs corresponding to fibers 1 and 3 are not aligned. Thus, fibers 1 and 3 exhibit significant modal dispersion for the wavelength of the source used. These fibers 1 and 3, therefore, have an effective modal bandwidth ($EMB_c$) calculated using their DMD graph, which is smaller than the effective modal bandwidth of fiber 2. Fibers 1 and 3 could be removed for certain applications and fiber 2 retained.

Figure 5:
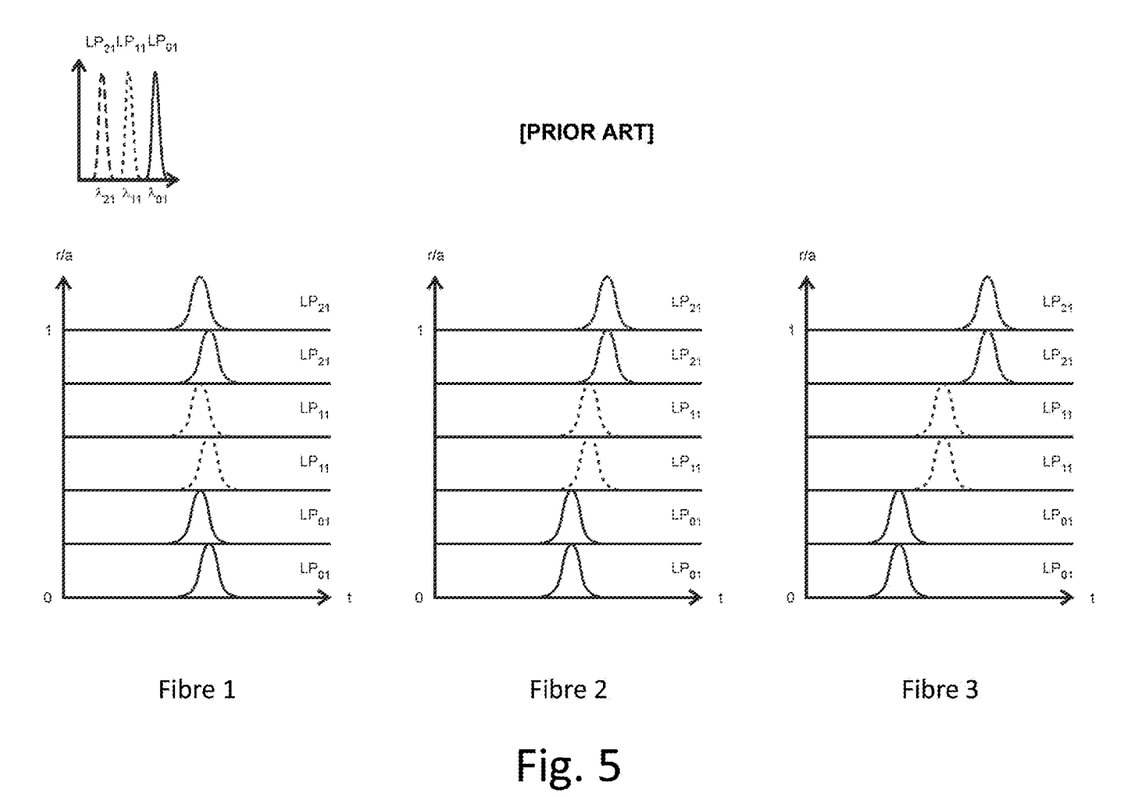
FIG. 5 graphically represents DMD graphs of three multimode fibers for an input light pulse with three transverse modes having three separate wavelengths at the output of a prior art optical system.
Figure 6:
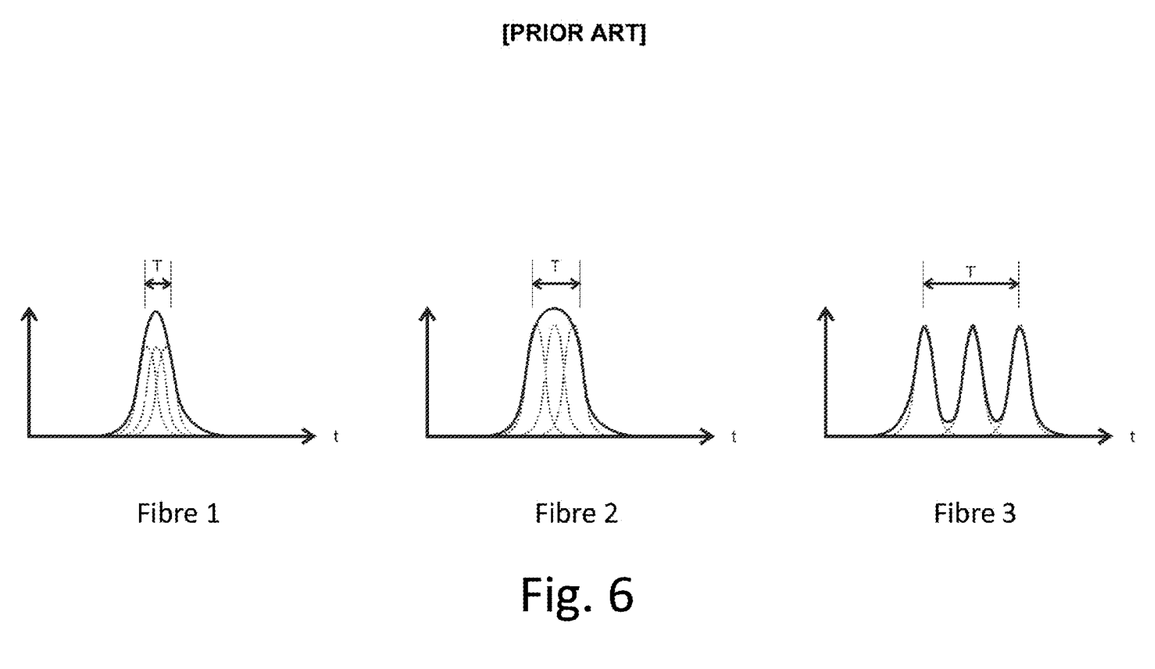
FIG. 6 schematically depicts the broadening of a light pulse at the output of a prior art optical system.

However, when a polychromatic source having several transverse modes is used, a modal dispersion is introduced despite the optimization of parameter α. FIG. 5 graphically represents DMD graphs of the three previous multimode fibers (i.e., fibers 1, 2 and 3 of FIG. 3) plotted for a polychromatic source with three transverse modes having three distinct wavelengths. As would be understood by one of ordinary skill in the art the source could have more than three transverse modes. FIG. 6 illustrates the broadening of the light pulse at the output of each fiber.

One having ordinary skill in the art would recognize that fiber 1 exhibits a substantially aligned DMD graph. In other words, each pulse has substantially the same delay after a particular length of fiber regardless of the radial point of injection of the signal (r/a). In the case of fiber 1, the chromatic dispersion has compensated for the modal dispersion. Furthermore, the different source modes have different propagation wavelengths and consequently the chromatic dispersion of the fiber induces an additional difference in group velocity between the modes of the fiber. When the injected light signal has several transverse modes, each having a different wavelength, the chromatic dispersion introduces a modal dispersion in the fiber (MCDI). The modal dispersion induced by the chromatic dispersion adds to (i.e., supplements) the modal dispersion induced by the index profile.

In this regard, the MCDI can be understood as an addition, as it delays the outer modes. The combination of the two effects (i.e., the modal dispersion induced by the chromatic dispersion and the modal dispersion induced by the index profile) leads to an increase of this delay that can be determined approximately as a simple addition of the two effects. The additional modal dispersion induced by the chromatic dispersion is independent of the optical fiber's index profile because the chromatic dispersion, for the most part, depends on the material of the optical wave guide.

Fiber 1, which exhibited a non-zero modal dispersion with a single mode source (as shown in FIG. 3), has a minimum "equivalent modal dispersion" with a multimode source (as shown in FIGS. 5 and 6). The term "equivalent modal dispersion" reflects the total dispersion resulting from both the index profile and the chromatic dispersion interference (MCDI).

Furthermore, FIGS. 5 and 6 illustrate that fiber 2, which had a virtually zero modal dispersion with a single mode source (as shown in FIG. 3), has a more significant equivalent modal dispersion with a multimode source due to the modal dispersion induced by the chromatic dispersion. Additionally, FIGS. 5 and 6 illustrate that the equivalent modal dispersion of fiber 3 is even greater than that of fiber 2.

A person of ordinary skill in the art would have rejected fibers 1 and 3 for applications in which a broad bandwidth is desired because their effective modal bandwidth calculated from the DMD graph ($EMB_c$) would have been considered below the recommendations of the standards applicable to Ethernet networks. For example, according to the TIA-492AAAC-A standard, any multimode fiber having an effective modal bandwidth $EMB_c$ less than 4700 MHz-km is not suitable for application in Ethernet networks having a data rate greater than 10 GbE over more than 550 m. One of ordinary skill in the art would understand that other threshold values can be chosen according to the standards in force and the applications envisaged.

Furthermore, FIGS. 5 and 6 illustrate that fiber 1 could be used in an optical system using a transverse multimode source because it has a minimized equivalent modal dispersion and consequently a satisfactory effective bandwidth. However, fiber 3 would be rejected for having a high equivalent modal dispersion. Similarly, fiber 2 would have a relatively low effective system bandwidth when used in a system with a transverse multimode source.

Accordingly, the invention proposes an optical system making it possible to achieve a significant effective bandwidth with polychromatic sources emitting multiple transverse modes. Typically, the modes emitted by the source are not filtered, thereby preventing an increase in the relative noise of the system.

In this regard, the invention modifies the distribution of the energy coupling of the transverse modes emitted by the source in the propagation modes of the fiber in order to exploit the modal dispersion induced by the chromatic dispersion or to limit its impact on the equivalent modal dispersion.

Figure 4:
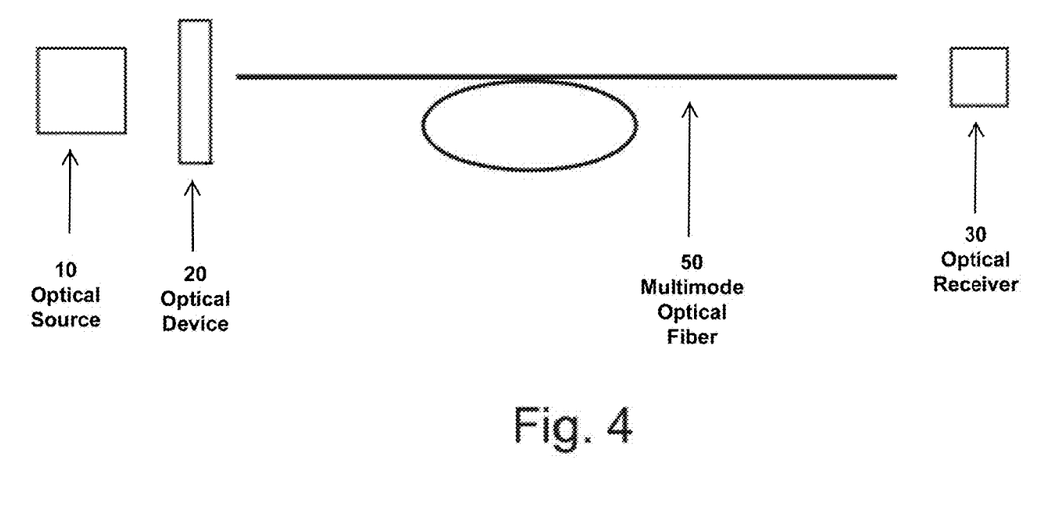
FIG. 4 schematically depicts an optical system according to the invention.

FIG. 4 schematically depicts an optical system according to the invention. FIG. 4 shows an optical source 10, which is, typically, a polychromatic source emitting a plurality of transverse modes (e.g., a VCSEL or a light-emitting diode (LED)). FIG. 4 also shows an optical receiver 30 and an optical link including a multimode optical fiber 50. FIG. 4 also shows an optical device 20 positioned between the source 10 and the input of the multimode fiber 50. The optical device 20 can modify the spatial distribution of the transverse modes emitted by the source.

It is believed that, due to the presence of the optical device 20, the higher-order modes of the source (i.e., the modes having shorter wavelengths) will not necessarily be coupled only in the high-order modes of the fiber. The higher-order modes of the fibers will thus mostly not carry the shortest wavelengths of the spectrum. The chromatic dispersion can, therefore, compensate or attenuate the modal dispersion.

Figure 7:
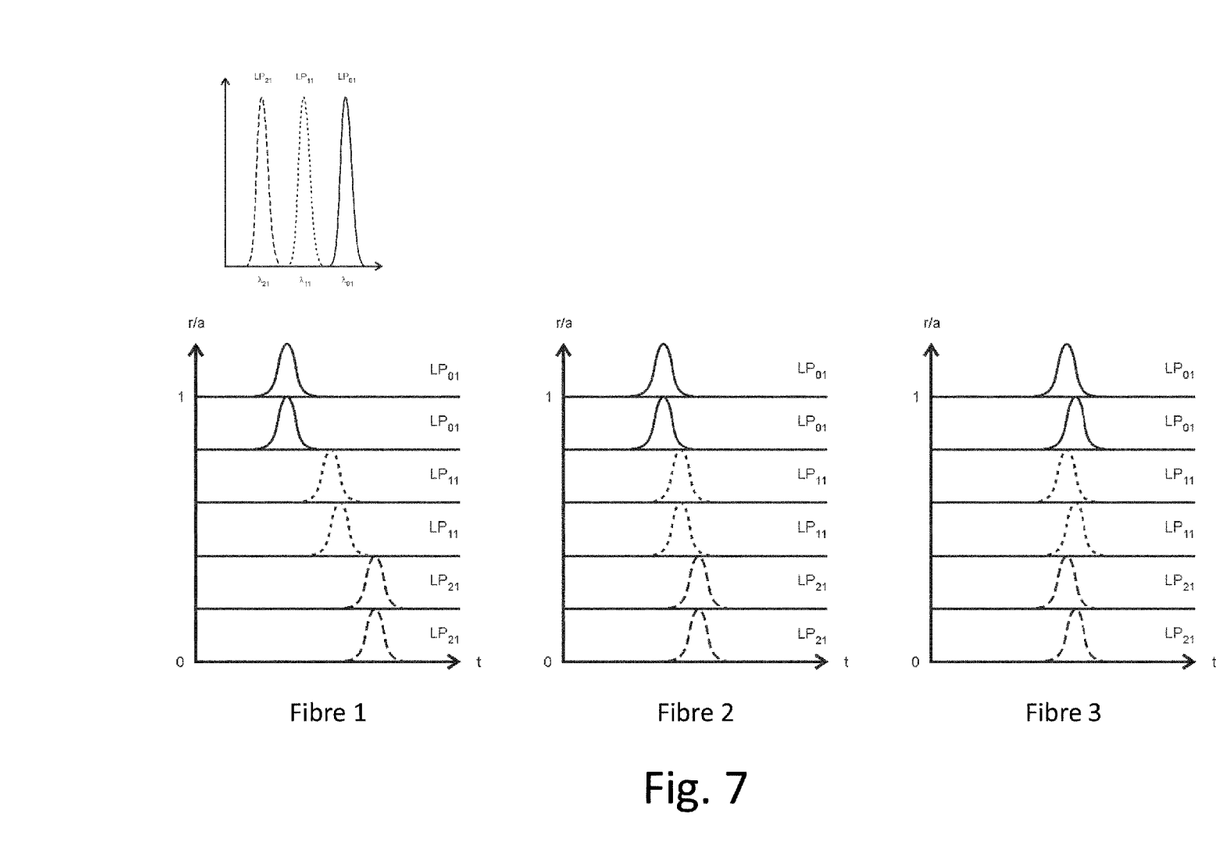
FIG. 7 graphically represents DMD graphs of three multimode fibers for an input light pulse with three transverse modes having three separate wavelengths at the output of an optical system according to an embodiment of the invention.
Figure 8:
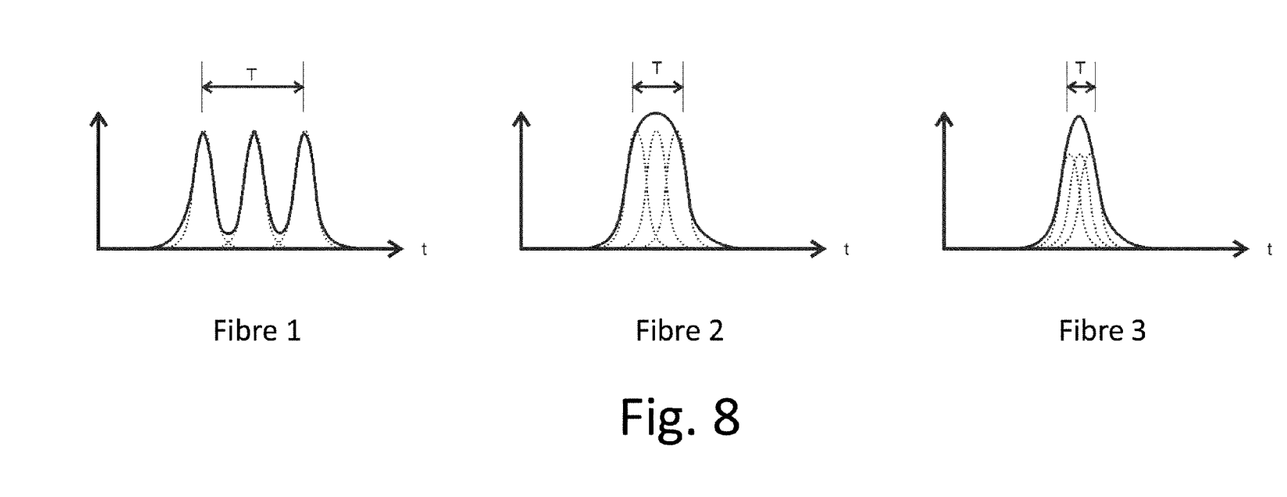
FIG. 8 schematically depicts the broadening of a light pulse at the output of an optical system according to an embodiment of the invention.

FIGS. 7 and 8 represent an embodiment of the invention. In this embodiment, the optical device modifies the distribution of the energy coupling of the transverse modes emitted by the source in the propagation modes of the fiber. The optical device makes it possible to couple the energy of a source mode (e.g., the fundamental mode $LP_{01}$, respectively the higher-order mode $LP_{21}$) in a mode of a different order in the fiber (e.g., the mode $LP_{21}$, respectively the mode $LP_{01}$). Exemplary optical devices include a phase mask produced by diffractive optics, an additional micro-lens, a Bragg grating engraved on the source or the fiber, or a mode scrambler. An Angle Polished Connector (APC) could also be used. Other optical devices that enable changing (or re-arranging) the spatial distribution or position of the transverse modes may also be used.

Fiber 3, which had a significant equivalent modal dispersion when used with a transverse multimode source (FIGS. 5 and 6), has a minimum equivalent modal dispersion when the energy of the fundamental mode of the source is coupled in a higher-order mode of the fiber (FIGS. 7 and 8). In this embodiment of the invention, modifying the distribution of the coupling of the transverse modes emitted by the source in the propagation modes of the fiber compensates for the index-profile-induced modal dispersion with the modal dispersion induced by the chromatic dispersion (MCDI).

On the other hand, FIGS. 7 and 8 illustrate that the modification of the distribution of the coupling of the transverse modes emitted by the source in the propagation modes of the fiber leads to a net increase in the equivalent modal dispersion in fiber 1. In this regard, the modal dispersion induced by the chromatic dispersion is added to the modal dispersion due to the profile of the fiber 1. Therefore, an optical system according to the invention using fiber 1 with a polychromatic multimode source may not achieve a satisfactory effective bandwidth for high-bandwidth Ethernet applications.

Accordingly, embodiments of the present invention enable the use of a multimode optical fiber having an effective modal bandwidth of less than 4700 MHz-km, which would have been rejected for many applications. In particular, the present invention allows for the use of such multimode optical fibers in an optical system including a transverse multimode optical source with an optical device suitable for modifying the distribution of the energy coupling of the transverse modes emitted by the source in the propagation modes of the fiber. In this regard, the effective bandwidth of the system is greater than 6000 MHz-km despite limited modal bandwidth of the fiber.

Figure 9:
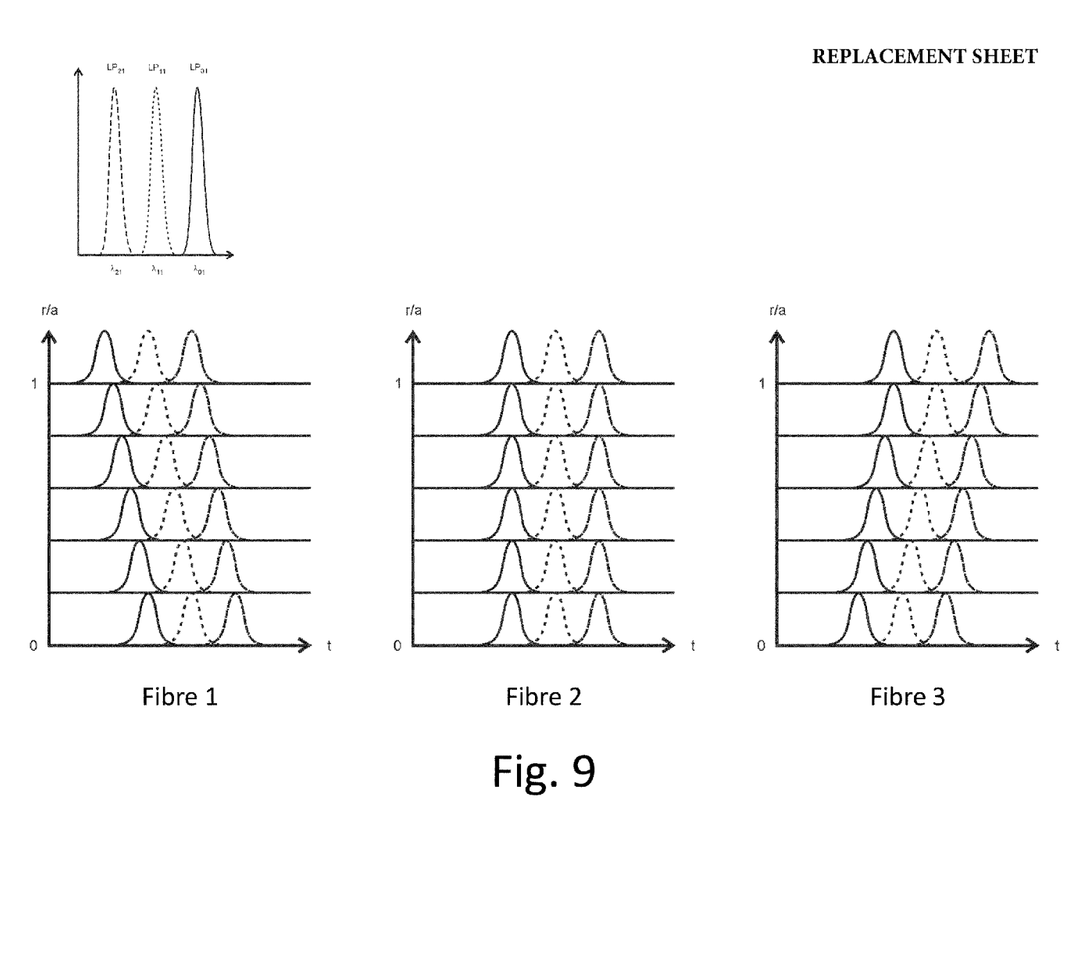
FIG. 9 graphically represents DMD graphs of three multimode fibers for an input light pulse with three transverse modes having three separate wavelengths at the output of an optical system according to an embodiment of the invention.
Figure 10:
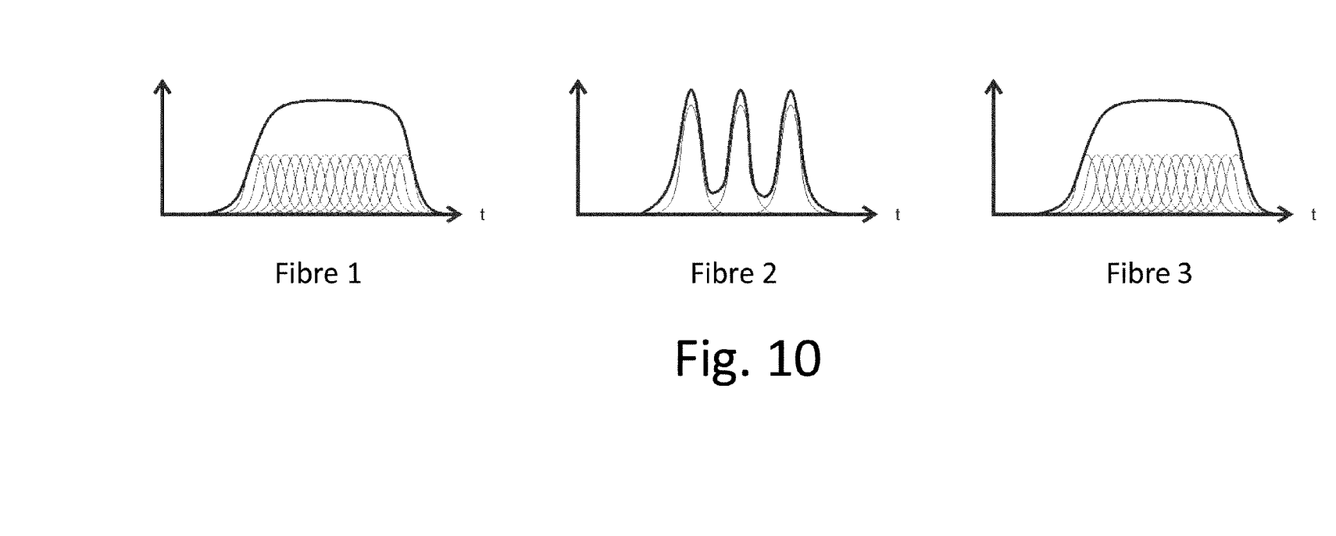
FIG. 10 schematically depicts the broadening of a light pulse at the output of an optical system according to an embodiment of the invention.

FIGS. 9 and 10 depict an embodiment of the invention. In this embodiment, the optical device modifies the distribution of the energy coupling of the transverse modes emitted by the source in the propagation modes of the fiber. The optical device, therefore, makes it possible to mix the different transverse modes emitted by the source to broaden the radial positions of each coupled mode in the multimode fiber. The energy of the different transverse modes of the source is then distributed over several propagation modes in the fiber. Exemplary optical devices can be produced by diffractive optics, an additional micro-lens, a Bragg grating engraved on the source or the fiber, or a mode scrambler. A connector of the APC (Angle Polished Connector) type could also be used. Other optical devices that enable changing (or re-arranging) the spatial distribution or position of the transverse modes may also be used.

As shown in FIG. 10, fibers 1 and 3 have a similar equivalent modal dispersion. In this embodiment, the energy of each mode emitted by the source is coupled in several of the propagation modes (e.g., all of the propagation modes) in the fiber. In this regard, the chromatic dispersion affects each mode of transmission in substantially the same fashion and the modal dispersion induced by the chromatic dispersion (MCDI) acts to attenuate the modal dispersion due to the profile of the fiber.

According to this embodiment, the effective bandwidth obtained is less than that obtained in the case where the chromatic dispersion acts to compensate the modal dispersion. Nevertheless, the system allows for the use of fibers 1 and 3, which would have been rejected for many applications because of their standard DMD measurement.

Accordingly, embodiments of the present invention enable the use of a multimode optical fiber having an effective modal bandwidth of less than 4700 MHz-km, which would have been rejected for many applications. In particular, the present invention allows for the use of such multimode optical fibers in an optical system including a transverse multimode optical source with an optical device suitable for modifying the distribution of the energy coupling of the transverse modes emitted by the source in the propagation modes of the fiber. In this regard, the effective bandwidth of the system is greater than 6000 MHz-km despite limited modal bandwidth of the fiber.

Typically, the maximum spectral width of the source is between 1 nanometer and 2 nanometers. Most of the commercially available VCSELs have an RMS (Root Mean Square) spectral width, measured as a standard deviation relative to the wavelength of greatest power, between 0 and 0.46 nanometers; a value $\lambda_{RMS}$ of 0.46 nanometers would lead to a maximum spectral width $\Delta\lambda_{max}$ of the order of 2 nanometers.

Multimode fibers are typically used for short-distance applications and local networks. The fiber lengths typically used are between a few meters and several hundred meters. In such a deployment, the modal dispersion induced by the chromatic dispersion remains limited, and it is possible to compensate for it by a fiber profile with an optimized graded-index.

The use of embodiments of the present invention make it possible to use low-cost transverse multimode optical sources to produce high-bandwidth Ethernet transmission networks over great distances having very good performances (e.g., with a product of distance by Gigabit Ethernet data rate which is larger than 3000 Gb/s·m and a binary error rate (BER) of approximately 10-12). The "distance by Gigabit Ethernet data rate" product corresponds to the length of the multimode fiber used multiplied by the Ethernet data rate of the system.

The description refers to multimode optical fibers with a graded index having a standardized core diameter of 50 μm, but it is understood that the invention is applicable to any type of multimode fiber used in an optical system as claimed.

The present invention is not limited to the foregoing exemplary embodiments. In particular, it is within the scope of the present invention to employ a fiber in combination with any type of a polychromatic source other than a VCSEL possessing several transverse modes, such as light-emitting diodes (LEDs).

This application incorporates entirely by reference the following commonly assigned patent application publications and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. Patent Application Publication No. US2009/0175583 A1 for a Microbend-Resistant Optical Fiber, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; U.S. patent application Ser. No. 12/436,423 for a Single-Mode Optical Fiber Having Reduced Bending Losses, filed May 6, 2009, (de Montmorillon et al.); U.S. patent application Ser. No. 12/436,484 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); and U.S. patent application Ser. No. 12/614,011 for a Reduced-Diameter Optical Fiber, filed Nov. 6, 2009 (Overton).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Patent Application Publication No. US2008/0145010 A1 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An optical system, comprising:
a polychromatic optical source for emitting an optical signal comprising a plurality of transverse modes of distinct transverse mode order, wherein each transverse mode has its own discrete wavelength;
an optical link comprising at least one portion of multimode optical fiber having a graded-index core, wherein said multimode optical fiber has a nominal refractive index profile described by the relationship:

$$n(r) = n_1 \sqrt{1 - 2\Delta\left(\frac{r}{a}\right)^\alpha}$$

where,
$n_1$ is the maximum refractive index of said multimode optical fiber's core;
r is the radial distance from said multimode optical fiber's optical axis;
a is the radius of said multimode optical fiber's core;
$\Delta$ is a non-dimensional parameter indicative of the refractive index difference between said multimode optical fiber's core and said multimode optical fiber's cladding; and
$\alpha$ is a non-dimensional parameter indicative of the shape of the refractive index profile of said multimode optical fiber's core, wherein $1.8 \leq \alpha \leq 2.2$; and
an optical device positioned between said polychromatic optical source and an input of said multimode optical fiber;
wherein, said optical device is suitable for spatially rearranging the plurality of transverse modes dependent on the transverse mode order for coupling the energy of each of the transverse modes into a suitable propagation mode for at least partially compensating modal dispersion of said optical link with chromatic dispersion.

2. The optical system according to claim 1, wherein:
said optical device is suitable for coupling the energy of at least one of the transverse modes into at least one suitable propagation mode of said optical link; and
the transverse mode order of at least one transverse mode differs from the order of at least one propagation mode.

3. The optical system according to claim 1, wherein the order of transverse modes is reversed by said optical device with respect to the order of propagation modes of said optical link.

4. The optical system according to claim 1, wherein the optical device is suitable for coupling the optical signal for distributing the energy of a transverse mode in a plurality of propagation modes of said multimode optical fiber.

5. The optical system according to claim 1, wherein:
said multimode optical fiber has an effective modal bandwidth ($EMB_c$) of less than about 4700 MHz-km; and
the optical system has an effective bandwidth (EB) of greater than or equal to about 6000 MHz-km.

6. The optical system according to claim 1, wherein said polychromatic optical source has a maximum spectral width of between about 1 nanometer and 2 nanometers.

7. The optical system according to claim 1, wherein said polychromatic optical source is a surface emitting laser (VCSEL).

8. The optical system according to claim 1, wherein the system has a product of distance by Gigabit Ethernet data rate greater than about 3000 Gb/s·m.

9. The optical system according to claim 1, wherein said optical device comprises a phase mask, a micro-lens, a Bragg grating, a mode scrambler, and/or a connector of the Angle Polished Connector (APC) type.

10. The optical system according to claim 1, wherein said optical device comprises a phase mask produced by diffractive optics.

11. The optical system according to claim 1, wherein said optical device comprises a Bragg grating engraved on either said polychromatic optical source or said multimode optical fiber.

12. A method of transmitting an optical signal, comprising:
emitting from a polychromatic optical source an optical signal having a plurality of transverse modes of distinct transverse mode order, wherein each transverse mode has its own discrete wavelength;
re-arranging the plurality of transverse modes of the optical signal dependent on the transverse mode order to couple the energy of the transverse modes into propagation modes, wherein the re-arranging is performed such that modal dispersion of an optical link that comprises a multimode optical fiber having a graded-index core is at least partially compensated by chromatic dispersion due to the re-arranging of the transverse modes of the optical signal over the propagation modes of the optical link; and
introducing the optical signal to the input of the optical link that comprises a multimode optical fiber having a graded-index core;
wherein the multimode optical fiber has a nominal refractive index profile described by the relationship:

$$n(r) = n_1 \sqrt{1 - 2\Delta\left(\frac{r}{a}\right)^\alpha}$$

where,
$n_1$ is the maximum refractive index of the multimode optical fiber's core;
r is the radial distance from the multimode optical fiber's optical axis;
a is the radius of the multimode optical fiber's core;
$\Delta$ is a non-dimensional parameter indicative of the refractive index difference between the multimode optical fiber's core and the multimode optical fiber's cladding; and
$\alpha$ is a non-dimensional parameter indicative of the shape of the refractive index profile of the multimode optical fiber's core, wherein $1.8 \leq \alpha \leq 2.2$.

13. The method according to claim 12, wherein the step of emitting the optical signal does not include filtering of the optical signal.

14. The method according to claim 12, wherein the step of re-arranging the transverse modes comprises coupling a fundamental mode of the optical signal in a higher-order propagation mode.

15. The method according to claim 12, wherein the step of re-arranging the transverse modes comprises distributing one or more transverse modes over several propagation modes.

16. An optical system, comprising:
a polychromatic optical source for emitting an optical signal comprising a plurality of transverse modes of distinct transverse mode order, wherein each transverse mode has its own discrete wavelength and wherein said polychromatic optical source has a maximum spectral width of between about 1 nanometer and 2 nanometers;
an optical link comprising at least one portion of multimode optical fiber having a graded-index core, wherein said multimode optical fiber has a nominal refractive index profile described by the relationship:

$$n(r) = n_1 \sqrt{1 - 2\Delta\left(\frac{r}{a}\right)^\alpha}$$

where,
$n_1$ is the maximum refractive index of said multimode optical fiber's core;
r is the radial distance from said multimode optical fiber's optical axis;
a is the radius of said multimode optical fiber's core;
$\Delta$ is a non-dimensional parameter indicative of the refractive index difference between said multimode optical fiber's core and said multimode optical fiber's cladding; and
$\alpha$ is a non-dimensional parameter indicative of the shape of the refractive index profile of said multimode optical fiber's core, wherein $1.8 \leq \alpha \leq 2.2$; and
an optical device positioned between said polychromatic optical source and an input of said multimode optical fiber, said optical device being suitable for (i) spatially re-arranging the plurality of transverse modes dependent on the transverse mode order for coupling the energy of each of the transverse modes into a suitable propagation mode for at least partially compensating modal dispersion of said optical link with chromatic dispersion, the transverse mode order of at least one transverse mode differing from the order of at least one propagation mode, and (ii) coupling the energy of at least one of the transverse modes into at least one suitable propagation mode of said optical link.

17. The optical system according to claim 16, wherein:
said multimode optical fiber has an effective modal bandwidth ($EMB_c$) of less than about 4700 MHz-km; and
the optical system has an effective bandwidth (EB) of greater than or equal to about 6000 MHz-km.

18. The method according to claim 12, wherein the step of re-arranging the transverse modes comprises distributing each transverse mode over several propagation modes.

19. The method according to claim 12, wherein the step of re-arranging the transverse modes comprises distributing each transverse mode over all propagation modes.

20. The method according to claim 12, comprising the step of characterizing the modal structure of the optical link that comprises the multimode optical fiber having a graded-index core.

\* \* \* \* \*